(12) United States Patent
Segawa et al.

(10) Patent No.: US 8,838,318 B2
(45) Date of Patent: Sep. 16, 2014

(54) ROUTE PLANNING DEVICE

(71) Applicant: Honda Motor Co., Ltd, Tokyo (JP)

(72) Inventors: Daisei Segawa, Wako (JP); Taisuke Tsurutani, Wako (JP); Masanori Hayashi, Wako (JP); Koichiro Takemasa, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/959,840

(22) Filed: Aug. 6, 2013

(65) Prior Publication Data

US 2014/0046595 A1  Feb. 13, 2014

(30) Foreign Application Priority Data

Aug. 9, 2012  (JP) .................. 2012-177441

(51) Int. Cl.
| | |
|---|---|
| *B60L 3/00* | (2006.01) |
| *B60L 15/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G01C 21/00* | (2006.01) |
| *G08G 1/0968* | (2006.01) |
| *G01C 21/34* | (2006.01) |

(52) U.S. Cl.
CPC .......... *G01C 21/34* (2013.01); *G08G 1/096827* (2013.01); *G01C 21/3469* (2013.01)
USPC ............................................. 701/22; 701/541

(58) Field of Classification Search
USPC .................................................... 701/22, 541
See application file for complete search history.

(56) References Cited

U.S. PATENT DOCUMENTS

| | | | |
|---|---|---|---|
| 2011/0307166 A1* | 12/2011 | Hiestermann et al. ........ | 701/119 |
| 2012/0053772 A1* | 3/2012 | Lu ................................... | 701/22 |

FOREIGN PATENT DOCUMENTS

| | | |
|---|---|---|
| JP | 2001-112121 A | 4/2001 |
| JP | 2006-115623 A | 4/2006 |

* cited by examiner

*Primary Examiner* — Imran Mustafa
(74) *Attorney, Agent, or Firm* — Westerman, Hattori, Daniels & Adrian, LLP

(57) ABSTRACT

A route planning device plans plural routes from a current location to a destination, calculates an amount of electricity consumed by a motor during driving to the destination along each planned route in each of plural drive modes, calculates an amount of electricity consumed by electric equipment during driving to the destination along each planned route for each of plural operational settings of the electric equipment, calculates an estimated amount of charge remaining in a battery on arrival at the destination, calculates, for each of the planned routes, a total comfort level score for each of the drive modes and/or each of the operational settings of the electrical equipment, selects plural operation plans each formed from a combination of the route, drive mode, and operational setting on the basis of the calculated total comfort level score, and displays the selected operation plans on a display.

13 Claims, 12 Drawing Sheets

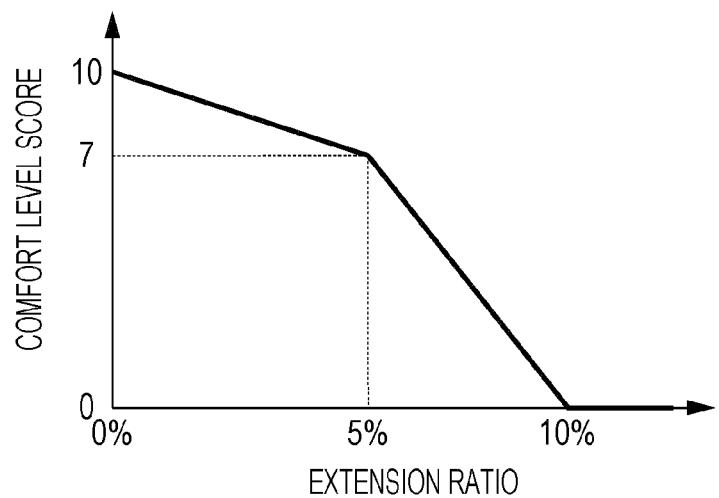

FIG. 15

| ROUTE TYPE | DRIVE MODE | AIR CONDITIONING SETTING | | | |
|---|---|---|---|---|---|
| | | OFF | PRESET VALUE -1°C | CURRENT PRESET VALUE | PRESET VALUE +1°C |
| FASTEST | SPORT | 5 | SOC NG | SOC NG | SOC NG |
| | NORMAL | 4 | SOC NG | SOC NG | 7 |
| | ECO | 3 | SOC NG | 7.5 | 6 |
| STANDARD | SPORT | 4 | SOC NG | SOC NG | SOC NG |
| | NORMAL | 3 | SOC NG | SOC NG | 6 |
| | ECO | 2 | SOC NG | 6.5 | 5 |
| ECO | SPORT | 3 | SOC NG | SOC NG | 7 |
| | NORMAL | 2 | SOC NG | 7.5 | 6 |
| | ECO | 1 | 6.5 | 6.5 | 5 |

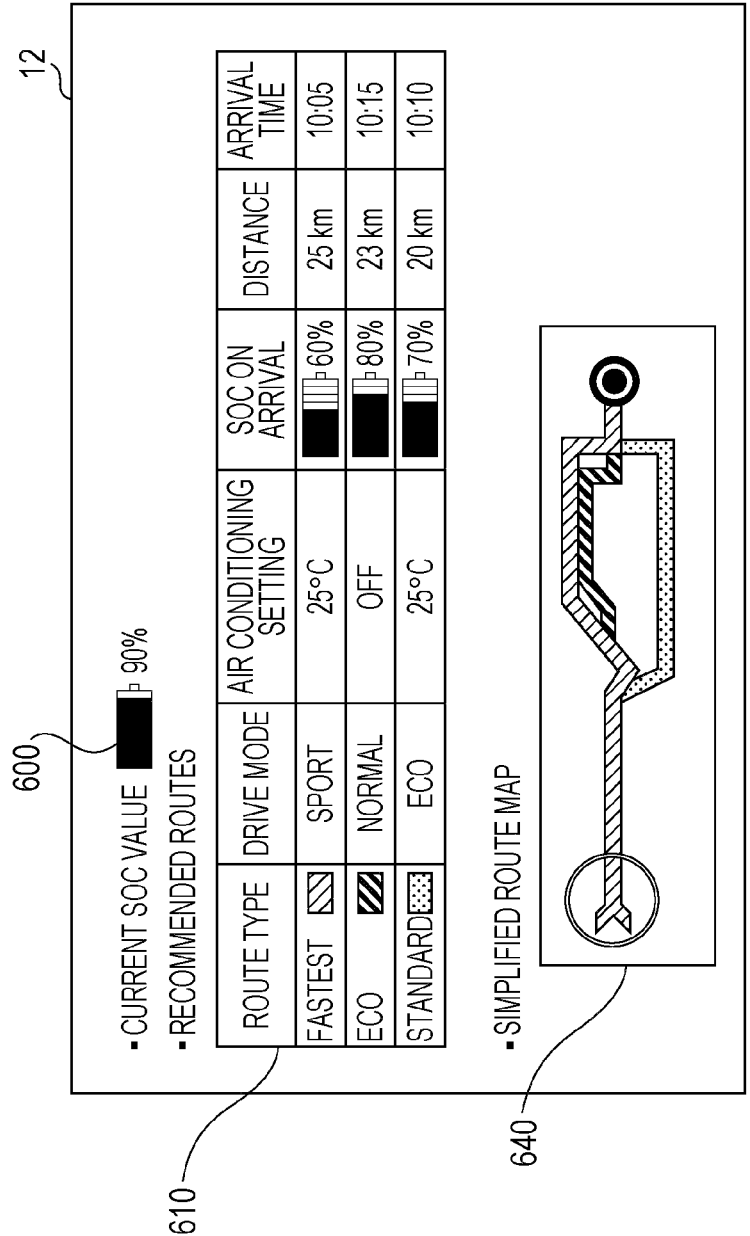

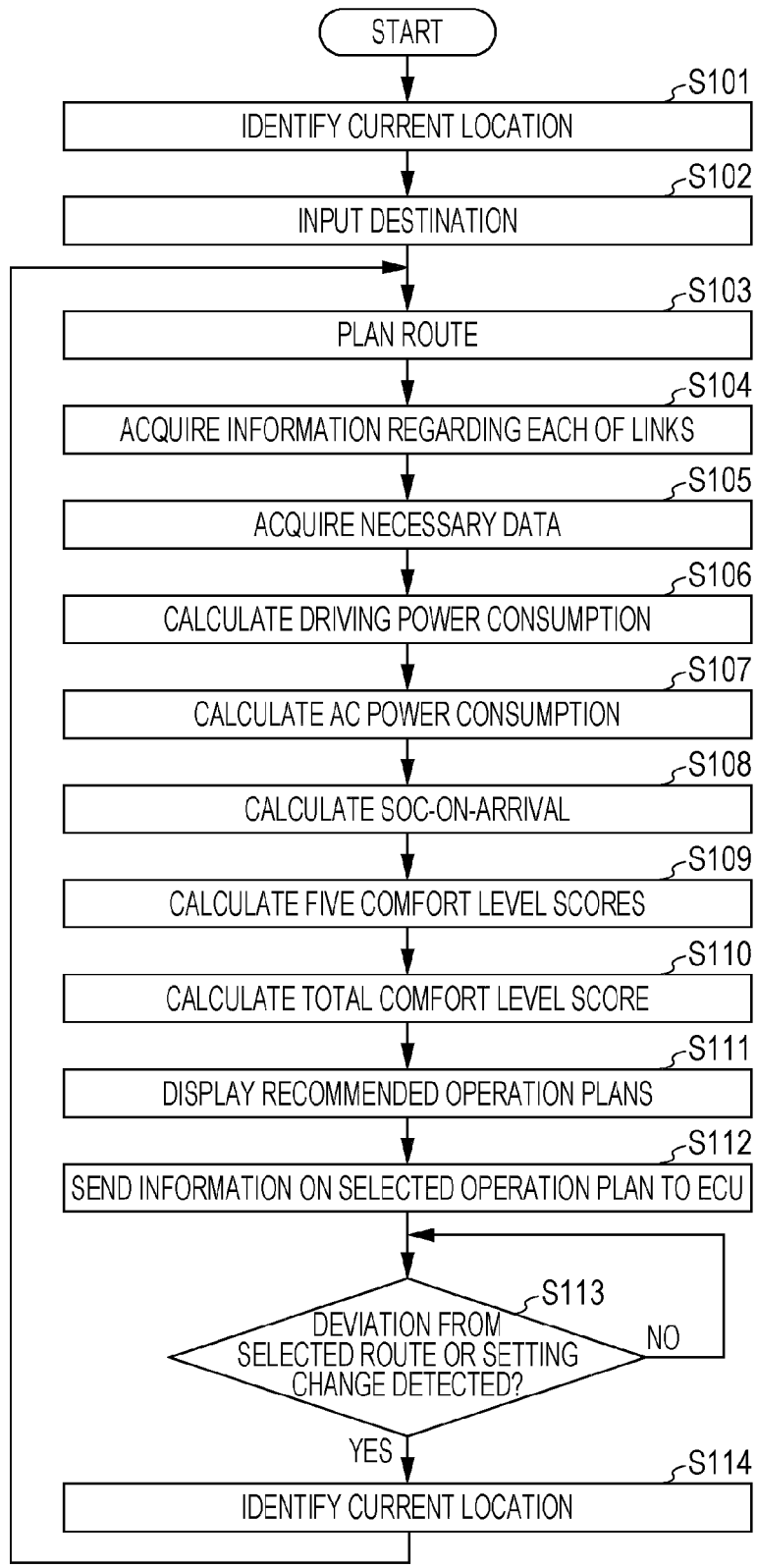

ROUTE PLANNING DEVICE

CROSS REFERENCES TO RELATED APPLICATIONS

The present application claims priority under 35 U.S.C. §119 to Japanese Patent Application No. 2012-177441, filed Aug. 9, 2012, entitled "Route Planning Device." The contents of this application are incorporated herein by reference in their entirety.

TECHNICAL FIELD

The present disclosure relates to a route planning device for a vehicle and, in particular, to a route planning device for an electric vehicle including a battery.

BACKGROUND

Electric vehicles include, a rechargeable battery and a motor and travel by supplying electric power from the battery to the motor. Accordingly, several issues that differ from those for vehicles using an existing internal-combustion engine arise.

For example, it is difficult for electric vehicles to have a battery capacity for providing a cruising distance that is substantially the same as that of existing gasoline-fueled vehicles. In addition, if equipment having a large amount of power consumption, such as an air conditioner, is used, the cruising distance is significantly decreased.

Furthermore, if a drive mode that increases the acceleration performance is selected, the cruising distance is significantly decreased due to an increase in power consumption during acceleration. That is, in an electric vehicle, there is a trade-off between a period of time during which various functions of the vehicle are used and the cruising distance. Accordingly, in order for a driver to find an optimal trade-off point, assistance to the driver is needed by providing various types of information to the driver.

As an example of such an assistance system, Japanese Unexamined Patent Application Publication No. 2001-112121 describes a "navigation system for electric vehicles" that assists a driver to travel to a destination. The system includes a display unit that displays a map and a control unit that switches the operation of a drive motor between a normal drive mode and an economy drive mode. The control unit displays information indicating a maximum driving distance of the electric vehicle in accordance with the current battery level over the displayed map. If the distance to a destination selected by the driver is outside the range, information regarding a charging time required to each the destination is displayed. However, if the distance to the destination is within the range, the control unit starts controlling travel in a normal drive mode. In addition, after the travel starts, in order to support a variation in power consumption caused by a drive operation and traffic jam, the control unit determines whether the vehicle is reachable to the destination on the basis of the distance between the current location and the destination as needed. Thereafter, the control unit switches the normal drive mode to an economy drive mode and displays information regarding charging time as needed.

As another example of a driver assistance system, Japanese Unexamined Patent Application Publication No. 2006-115623 describes a "travelable distance estimation system" including electric vehicles and a data center connected to each of the electric vehicles so as to communicate with the electric vehicle and display information regarding a maximum driving distance accurately estimated on the basis of the level of a battery mounted in the electric vehicle. In this system, every time each of the electric vehicles passes over a node, the electric vehicle transmits, to the data center, information including the amount of battery power consumed in a road link along which the vehicle traveled, a link number of the road link, the model and the model year of the vehicle, the driving characteristics of the driver (three-grade evaluation based on a variation of the speed of an accelerator position), and information as to whether an air conditioner is used. At that time, the data center calculates the average battery power consumed in each of the road links for each of combinations of a driving characteristic, a model of vehicle, and use/non-use of air conditioning. Thus, the data center stores the calculated data therein. Thereafter, if one of the electric vehicles transmits information regarding the start point, the transit point, the destination point, and the calculation conditions (the model of the vehicle, use/non-use of air conditioning, and driver characteristics) to the data center, the data center plans an appropriate route from the start point to the destination point and finds the links that constitute the route, the average battery power consumed for each of the links, and the average battery power consumed for a route from the current location to the destination point on the basis of the above-described calculation conditions. Subsequently, the data center transmits the found result to the electric vehicle.

However, it is difficult to ensure that the vehicle responds faithfully to the driver's intent by simply switching between the economy drive mode and the normal drive mode as in the system described in Japanese Unexamined Patent Application Publication No. 2001-112121. That is, if only the amount of charge remaining in the battery (state-of-charge (SOC)) is the first priority, control based on economy driving is sufficient. However, in reality, the driver wants the driver assistance system to provide not only appropriate control of SOC but also overall control including driver comfort and satisfaction in driving and a certain level of interior comfort. In addition, such requirements and the priorities of the requirements may have a variety of patterns in accordance with an amount of spare time that the driver may have before he/she arrives the destination. That is, by using the technique simply focused on whether the vehicle can arrive at the destination as described in Japanese Unexamined Patent Application Publication No-2001-112121, the demand of the driver who wants comfortable driving cannot be satisfied.

In the system described in Japanese Unexamined Patent Application Publication No. 2006-115623, the maximum driving distance can be accurately computed in consideration of the vehicle individual difference and driver's individual difference, such as the battery power consumption trend (the deterioration trend) based on the model year of the vehicle and the driving characteristics of the drivers. However, only the computed maximum driving distance is displayed on the display unit. Detailed information as to how comfortable driving is scheduled is not presented. That is, information regarding how to drive, what onboard equipment is used, and what setting need to be made on the onboard equipment in order to realize comfortable driving is not provided.

SUMMARY

Accordingly, the present application provides a route planning device that assists a driver in driving an electric vehicle comfortably in consideration of a trade-off between driver comfort in terms of operability and interior comfort and a maximum driving distance.

According to an embodiment of the present disclosure, a route, planning device for planning a driving route for an electric vehicle is provided. The route, planning device, includes a processing unit including a computer. Upon receiving position information of a destination, the processing unit plans at least one route from a current location to the destination, calculates an amount of electricity consumed by a motor mounted in the electric vehicle during driving to the destination along each of the planned routes in each of a plurality of drive modes having different conditions of controlling the motor, calculates an amount of electricity consumed by electric equipment mounted in the electric vehicle during a period of driving along each of the planned routes for each of a plurality of operational settings of the electric equipment, calculates an estimated value of an amount of charge remaining in a battery when the electric vehicle arrives at the destination on the basis of the amount of electricity consumed by the motor and the amount of electricity consumed by the electrical equipment, calculates, for each of the planned routes, a total comfort level score for each of the drive modes and/or each of the operational settings of the electrical equipment on the basis of a predetermined comfort level score for each of the estimated values of the amount of charge remaining in the battery, a predetermined comfort level score for each of the drive modes, and a predetermined comfort level score for each of the operational settings of the electrical equipment, selects a plurality of operation plans each formed from a combination of one of the routes, one of the drive modes, and one of the operational settings of the electrical equipment on to basis of the magnitude of the calculated total comfort level score, and displays the selected operation plans on a display unit.

The calculated total comfort level score can include a total comfort level score, obtained when a current setting of the electrical equipment remains unchanged.

When one of the selected operation plans displayed on the display unit is selected, the processing unit can perform setting on the electrical equipment directly or indirectly through another device and start giving route guidance along the selected planned route.

After route guidance starts in accordance with the selected one of the operation plans displayed on the display unit, the processing unit can detect deviation of the driving vehicle from a route indicated by the selected operation plan and/or a change in the operational setting of the electrical equipment from the operational setting indicated by the selected operation plan directly or indirectly via another device and notify a passenger of the electric vehicle of the deviation and/or the change in the operational setting.

According to another embodiment of the present disclosure, a method for planning a driving route for use in an electric vehicle is provided. The method includes planning at least one route from a current location to a destination, calculating an amount of electricity consumed by a motor mounted in the electric vehicle during driving to the destination along each of the planned routes in each of a plurality of drive modes having different conditions of controlling the motor, calculating an amount of electricity consumed by electric equipment mounted in the electric vehicle during a period of driving along each of the planned routes for each of a plurality of operational settings of the electric equipment, calculating an estimated value of an amount of charge remaining in the battery when the electric vehicle arrives at the destination on the basis of the amount of electricity consumed by the motor and the amount of electricity consumed by the electrical equipment, calculating, for each of the planned routes, a total comfort level score for each of the drive modes and/or each of the operational settings of the electrical equipment on the basis of a predetermined comfort level score for each of the estimated values of the amount of charge remaining in the battery, a predetermined comfort level score for each of the drive modes, and a predetermined comfort level score for each of the operational settings of the electrical equipment, selecting a plurality of operation plans each formed from a combination of one of the routes, one of the drive modes, and one of the operational settings of the electrical equipment on the basis of the magnitude of the calculated total comfort level score, and displaying the selected operation plans on a display unit.

According to still another embodiment of the present disclosure, a computer-readable program includes program code for causing a processing unit including a computer to perform the steps of the above-described method.

According to one aspect of the present disclosure, when driving an electric vehicle, a driver can receive assistance so as to have an operation plan that maximizes the comfort level in consideration of a trade-off between driver comfort in terms of operability and interior comfort and a maximum driving distance.

BRIEF DESCRIPTION OF THE DRAWINGS

The advantages of the disclosure will become apparent in the following description taken in conjunction with the following drawings.

FIG. 13 illustrates an example of distance comfort level score data stored in the information storage unit of the route planning device.

FIG. 14 illustrates an example of driving comfort level score data stored in the information storage unit of the route planning device.

FIG. 15 illustrates an example of the result of calculation of a total comfort level score performed by a comfort level calculator of the route planning device.

FIG. 16 illustrates an example of displayed operation plans selected by an operation plan selector of the route planning device.

FIG. 17 is a flowchart illustrating the sequence of operations performed by the route planning device.

DETAILED DESCRIPTION

Exemplary embodiments of the present disclosure are described below with reference to the accompanying drawings. According to the present exemplary embodiments, route planning device is wirelessly connected to a remote navigation server. The route planning device plans a plurality of driving routes from the current position to the destination. In addition, the route planning device exchanges information with an electronic control unit (ECU) mounted in an electric vehicle via a bus interface, such as a universal serial bus (USB). The ECU controls the electric vehicle. Thus, the route planning device collects vehicle information, such as an amount of charge remaining in the battery and the air conditioner preset temperature. Thereafter, the route planning device evaluates the comfort levels obtained when the vehicle travels along each of the routes on the basis of the vehicle information in terms of power consumption and a room temperature. Subsequently, the route planning device displays, on a display unit, a plurality of combinations of a route, having a higher comfort level and an operational setting (e.g., the setting of a drive mode and the setting of an as conditioner temperature) (hereinafter, the combination is referred to as an "operation plan"). Thus, the driver can select one of the operation plans that is the most comfortable from the driver's point of view. In addition, if the driver selects one of the operation plans, the route planning device makes electrical setting, such as setting of the drive mode, and setting of an air conditioner, via the ECU in accordance with the selected operation plan. Furthermore, the route planning device instructs an onboard navigation system to start giving route guidance based on the route indicated by the selected operation plan.

Figure 1:
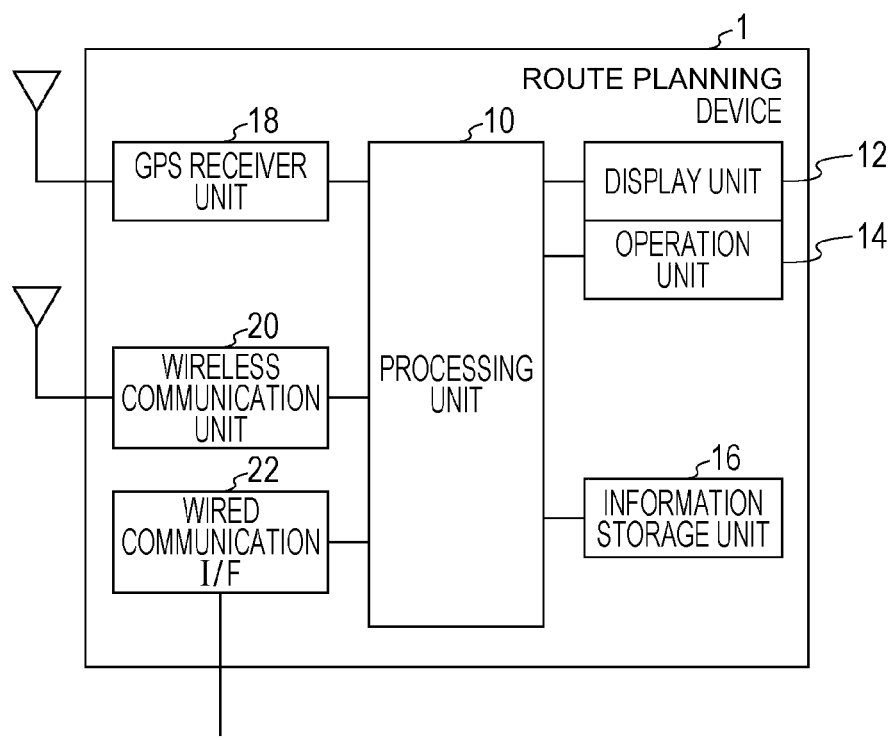
FIG. 1 is a block diagram of the configuration of a route planning device according to an exemplary embodiment of the present disclosure.

FIG. 1 is a block diagram of an exemplary configuration of the route planning device according to an exemplary embodiment of the disclosure. A route planning device 1 includes a processing unit 10, a display unit 12, an operation unit 14, an information storage unit 16, a GPS receiver unit 10, a wireless communication unit 20, and a wired communication interface (I/F) 22. Since the above-described units of the route planning device 1 are similar to units generally included in commercially available, smartphones, the route planning device 1 can be realized using, for example, a smartphone having a specific application program installed therein.

A display device, such as a liquid crystal display (LCD) or an organic electroluminescence (EL) display, can be used as the display unit 12. The operation unit 14 is an input device used by a user when the user inputs information and an instruction into the route planning device 1. A touch panel disposed on a display screen of the display unit 12 can be used as the operation unit 14.

The GPS receiver unit 18 receives GPS signals each including positioning data from a plurality of GPS satellites and computes the longitude and latitude of the current position. In addition, the GPS receiver unit 18 may receive an electric wave transmitted from a base station of cell phones and compute the longitude and latitude of the current position on the basis of the position information of the base station. The wireless communication unit 20 communicates with a remote server via, for example, a wireless network.

The wired communication I/F 22 is a communication interface for exchanging data with other devices, such as a personal computer and the ECU and the navigation system of the electric vehicle, via a wired transmission line. The wired communication I/F 22 may be an interface that complies with communication standards, such as a universal serial bus (USB) or a controller area network (CAN). Note that the wired communication I/F 22 is used for communicating with an onboard device. Instead of using the wired communication I/F 22, a short range wireless communication device that performs short range wireless communication, such as Bluetooth®, can be used.

Any type of storage unit, such as a semiconductor memory or a fixed disk drive, can be used as the information storage unit 16. The information storage unit 16 stores a variety of types of data used for the operation performed by the processing unit 10 (described in more detail below).

Figure 2:
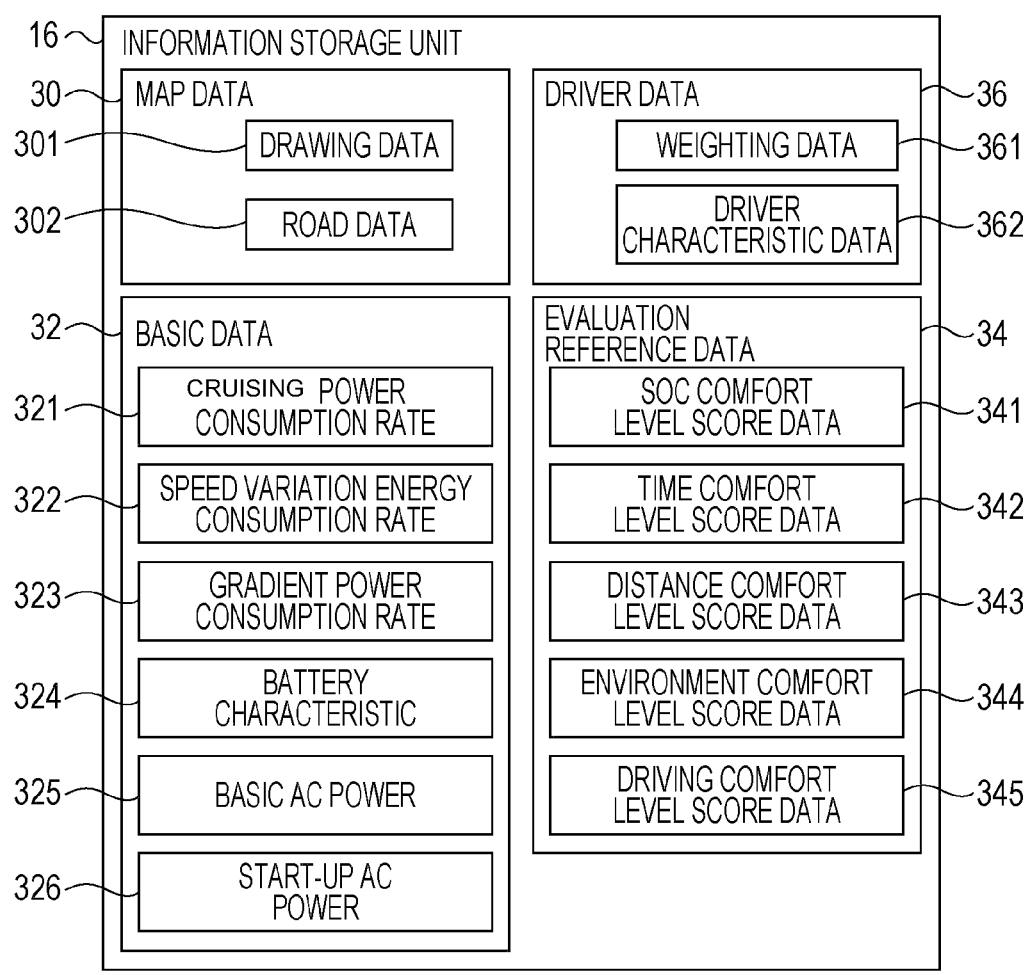
FIG. 2 illustrates a variety of types of data stored in an information storage unit of the route planning

FIG. 2 illustrates a variety of types of data stored in the information storage unit 16. The information storage unit 16 stores map data 30, basic data 32 used for calculating power consumption required for traveling along each of the road links, evaluation reference data 34 used for calculating the comfort level of a route from a current location to a destination, and driver data 36 indicating a driver's preference and a driver's driving style.

Note that all or some of the data can be downloaded from a storage unit of a server located outside the vehicle via the wireless communication unit 20 or can be downloaded from a storage unit mounted in the vehicle via the wired communication I/F 22.

The map data 30 includes drawing data 301 used for drawing a map image on the display unit 12 and road data 302 indicating information regarding road connections. The road data 302, includes the position information, identification information, and attribute information regarding each of the road links of each road. As used herein, the term "road link" refers to a section of a road between two neighboring nodes when the road is separated by coordinate points serving as milestones (nodes), such as traffic intersections. The attribute information regarding a road link includes the length and the average gradient of the road link, the current average speed, the type of the road, and the current traffic regulation.

Among the map data 30 stored in the information storage unit 16, in particular, the current average, vehicle speed and the current traffic regulation included in the above-described attribute information can be received from, for example, the Vehicle Information and Communication System (VICS®) or a server of the internavi information system. For example, VICS® provides a current estimated average vehicle speed in each of the sections (the links) in addition to traffic jam information, road work information, and road regulation information. The internavi information system provides, for example, information on each of the types of road and the average gradient of each of the sections (links) of the road. In addition, the internavi information system can obtain a vehicle speed pattern for each of the sections from a probe car and compute an average vehicle speed for each of the sections. Furthermore, the internavi information system accumulates information regarding the average vehicle speed for each of the sections on an hourly basis or a day-of-the-week basis.

The basic data 32 (refer to FIG. 2) includes cruising power consumption rate data 321, speed variation energy consumption rate data 322, gradient power consumption rate data 323, battery characteristic data 324, basic AC power data 325, and start-up AC power data 326. The cruising power consumption rate data 321 indicates the power consumption rate per unit distance when the vehicle, which is an electric vehicle, travels at a constant speed on a flat road. The speed variation energy consumption rate data 322 indicates the energy consumption rate additionally consumed due to acceleration or deceleration. The gradient power consumption rate data 323 indicates the power consumption rate additionally consumed when the vehicle travels on a sloped, road. The battery characteristic data 324 indicates a relationship between the amount of energy (power) remaining in the battery and a SOC value. The basic AC power data 325 indicates power consumed per unit time by the air conditioner in order to maintain the room temperature at a constant value. The start-up AC power data 326 indicates AC power consumed by the air conditioner in order to change the room temperature, immediately after the air conditioner starts operating to the preset room temperature.

Note that the basic data for each of the models of electric vehicles may be managed using a server disposed outside a vehicle in the form of a database, and the vehicle may download the basic data 32 for the vehicle model of the vehicle from to database in the server into the information storage unit 16 via the wireless communication unit 20. Alternatively, the basic data 32 for the vehicle may be stored in a storage unit mounted in the vehicle, and the vehicle may download the basic data 32 into the information storage unit 16 via the wired communication I/F 22.

The evaluation reference data 34 (refer to FIG. 2) includes SOC comfort level score data 341 based on the amount of charge remaining in the battery obtained when the vehicle arrives at the destination, time comfort level score data 342 based on a driving time required for traveling from the current location to the destination, distance comfort level score data 343 based on the distance from the current location to the destination, environment comfort level score data 344 based on the air conditioner setting temperature, and a driving comfort level score data 345 based on the drive mode.

The driver data 36 includes weighting data 361 for assigning a weight based on a driver's preference when the processing unit 10 performs a calculating process and driver characteristic data 32 indicating the driver's driving style. The driver's driving style can be quantitatively expressed using multi-level evaluation based on the driver's past driving history (e.g., an average vehicle speed, the magnitudes of acceleration and deceleration, and the frequency of accelerating and decelerating operations). In such a case, the driver characteristic can be expressed as an evaluation value, in multi-level evaluation (e.g., one of values from 1 to 3 in three-level evaluation). For example, the driver characteristic can be expressed as follows:

driver characteristic for a driver who prefers sporty driving (a quick response): evaluation value=3, driver characteristic for a driver who prefers moderate speed and acceleration: evaluation value=2, and driver characteristic for a driver who prefers gentle driving: evaluation value=1.

The driver characteristic can be obtained by the ECU mounted in the vehicle. The ECU can record the average vehicle speed, the magnitudes of acceleration and deceleration, and the frequency of accelerating and decelerating operations and calculate the driver characteristic at predetermined intervals. In such a case, the route planning device 1 can download the driver characteristic data 362 from the ECU via the wired communication I/F 22.

The processing unit 10 includes a computer having a central processing unit (CPU) and a memory. The processing unit 10 plans a plurality of candidates of a driving route from the current location to the destination on the basis of the variety of information stored in the information storage unit 16. In addition, the processing unit 10 calculates the comfort level for each of the planned routes.

Figure 3:
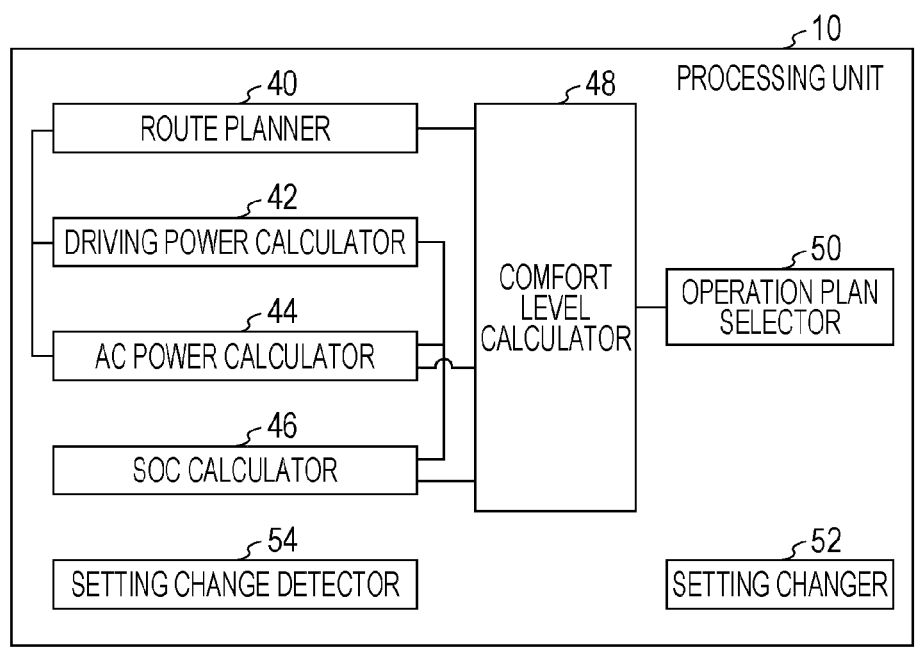
FIG. 3 is a block diagram of the functional configuration of a processing unit of the route planning device.

FIG. 3 is a block diagram of the functional configuration of the processing unit 10. The processing unit 10 is formed from a computer including a CPU, a read only memory (ROM) storing a program, and a random access memory (RAM) for temporarily storing data.

The processing unit 10: includes a route planner 40, a driving power calculator 42, an AC power calculator 44, an SOC calculator 46, a comfort level calculator 48, an operation plan selector 50, a setting changer 52, and a setting change detector 54. Each of these components is realized by a computer program running on the processing unit 10 (a computer). In addition, the computer program can be stored in any type of a computer-readable storage medium. The functions of these components of the processing unit 10 are described below.

1. Route Planner

Upon receiving the position information (the latitude and longitude) of the destination from the operation unit 14, the route planner 40 starts planning a plurality of driving routes from the current location and the destination. The plurality of routes include the fastest route (namely that with the shortest travel time), an eco-route which is the most power efficient, and a standard route with a shortest distance to the destination along roads each having a predetermined width or greater. Note that the position information of the destination can be input by the user selecting the destination on a map displayed on the display unit 12 through the operation unit 14 (e.g., a touch panel).

The information (the latitude and longitude) of the current location is set using the position information obtained by the GPS receiver unit 18 on the basis of the position information included in a. GPS radio wave or the position information of a cell phone base station. Alternatively, like the above-described position information of the destination, the position information of the current location can be input by the user.

Figure 4A:
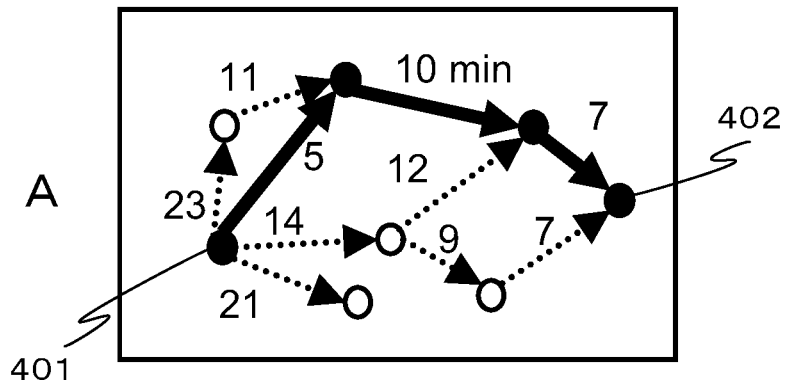
FIGS. 4A to 4C illustrate an example of routes planned by a route planner of the route planning device.
Figure 4B:
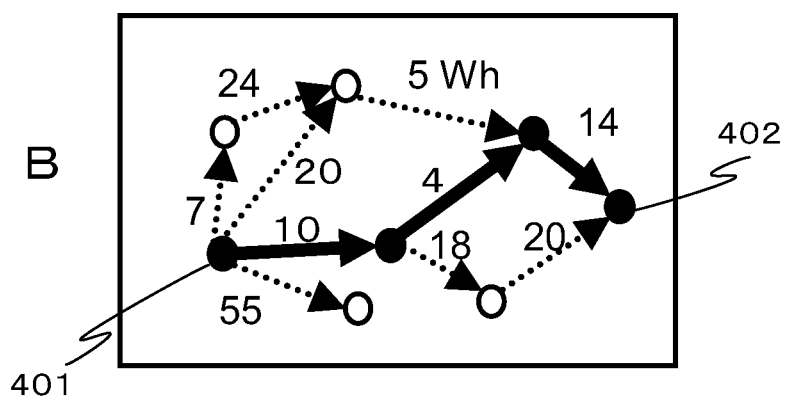
Figure 4C:
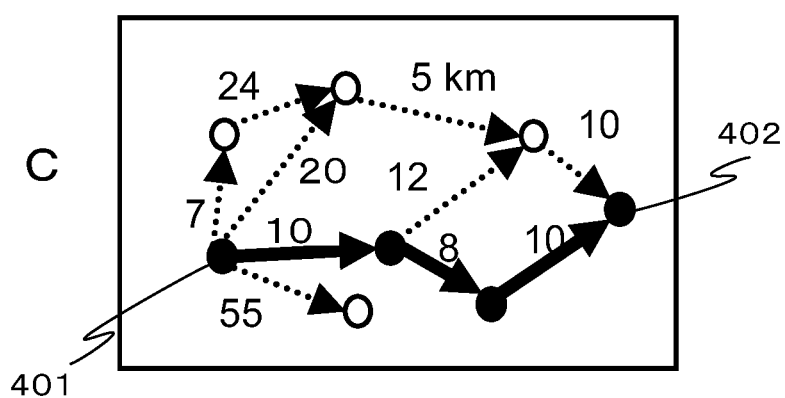

FIGS. 4A to 4C illustrate an example of the routes planned by the route planner 40. FIGS. 4A, 4B, and 4C' illustrate the fastest route, an eco-route, and a standard route, respectively. In FIGS. 4A to 4C, white circles and black circles represent nodes, and an arrow between two nodes represents a road link. A node 401 indicates the current location, and a node 402 indicates the destination. The planned route is expressed by arrows with a thick line and black circles.

In FIG. 4A, the number next to each arrow indicating a road link represents a driving time required when driving along the link. The fastest route with the shortest driving time (i.e., 22 minutes (5+10+7 minutes)) is indicated by the arrows with a thick line in such a case, a driving time for each of the road links can be obtained using, for example, the distance of the road link and the average speed included in the attribute information of the road link in the map data 30 stored in the information storage unit 16.

In FIG. 4B, the number next to each arrow indicating a road link represents the power required when driving along the link. The eco-route with the smallest power consumption (i.e., 28 Wh (10+4+14 Wh)) is indicated by to arrows with a thick line. In such a case, the typical power consumption value for a widely used electric vehicle or hybrid vehicle can be used as power consumption for each of the road links. For example, the typical power consumption value can be included as the attribute information of each of the road links in the map data 30: stored in the information storage unit 16.

In FIG. 4C, the number next to each arrow indicating a road link represents the length of the road link. The standard route with the smallest distance (i.e., 20 km (10+8+10 km)) is indicated by an arrow with a thick line. The standard route is defined as a "route with the shortest distance along roads having a predetermined width or greater". Thus, the standard route is considered as an "easy to drive road".

Note that the route planner 40 can directly plan routes on the basis of the map data 30. Alternatively, the route planner 40 may request a server disposed outside the vehicle or an onboard navigation system to plan routes via the wireless communication unit 20 or the wired communication I/F 22 and obtain the result of the route planning.

The route planner 40 sends information regarding each of the found routes (hereinafter referred to as "planned routes") (i.e., route information) to the comfort level calculator 48, the driving power calculator 42, and the AC power calculator 44. The route information includes a total driving distance LENt and a total driving time Tt for each of the planned routes, the information regarding road links of each of the planned routes (the road link information) (e.g., a list of identification information of the road links).

2. Driving Power Calculator

The driving power calculator 42 calculates, for each of the routes planned by the route planner 40, the amount of electricity consumed when the vehicle travels along the planned route (total drive power consumption Pd). That is, the driving power calculator 42 calculates, for each of the road links of each planned route, the amount of electricity consumed when the vehicle travels along the road link (driving power consumption Pdr). Thereafter, the driving power calculator 42 sums the driving power consumption Pdr for the road links throughout the planned route. In this manner, the driving power calculator 42 calculates the total drive power consumption Pd for the planned route.

In order to calculate the driving power consumption Pdr for each of the road links, the cruising power consumption rate data 321, the speed variation energy consumption rate data 322, and the gradient power consumption rate data 323 included in the basic data 32 stored in the information storage unit 15 are used.

Figure 5:
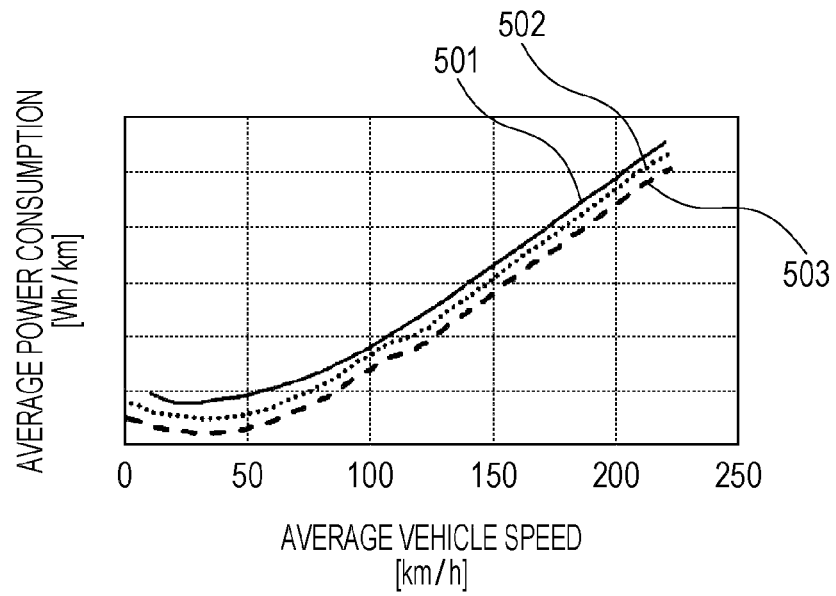
FIG. 5 illustrates an example of cruising power consumption rate data stored in the information storage unit of the route planning device.

The cruising power consumption rate data 321, the speed variation energy consumption rate data 322, and the gradient power consumption rate data 323 are described below with reference to FIGs. 5 to 7. FIG. 5 illustrates an example of the cruising power consumption rate data 321 stored in the information storage unit 16. In FIG. 5, the abscissa represents an average vehicle speed, and the ordinate represents average power consumption. A curve 501 (a solid line), a curve 502 (a dotted line), and a curve 503 (a dashed line) indicate the power consumption rates (the cruising power consumption rates) per unit distance for a vehicle speed at which the vehicle travels on a flat road in the following drive, modes: a sport mode, a normal mode, and an eco mode, respectively.

As used herein, the term "drive mode" refers to a type of motor control operation based on a motor control condition for driving the vehicle. According to the present exemplary embodiment, the control operation is classified using the upper limit of acceleration generated in a motor. A drive mode in which the highest acceleration upper limit is provided in order to put a priority on an acceleration performance is defined as a "sport mode". A drive mode in which the lowest acceleration upper limit is provided in order to put a priority on power saving is defined as an "eco mode". A drive mode in which an acceleration upper limit value is set to a value between those in the sport mode and the eco mode so that a driver does not feel dissatisfied with the acceleration is defined as a "normal mode". Note that classification of the drive mode is not limited thereto. For example, the drive mode may be classified using the upper limit of the speed or a combination of the upper limit of the speed and the upper limit of the acceleration.

Figure 6:
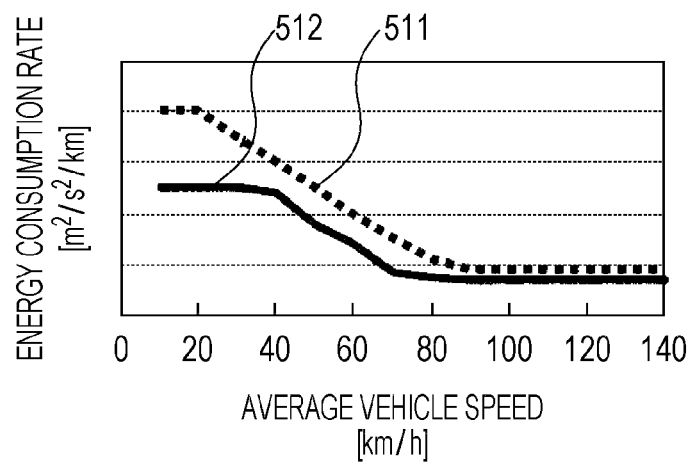
FIG. 6 illustrates an example of speed variation energy consumption rate data stored in the information storage unit of the route planning device.

FIG. 6 illustrates an example of the speed variation energy consumption rate data 322 stored in the information storage, unit 16. In FIG. 6, the abscissa represents an average vehicle speed, and the ordinate represents an energy consumption rate per unit distance. A curve 511 (a dotted line) and a curve 512 (a solid line) indicate the speed variation energy consumption rates obtained when the vehicle travels on an express way and an urban street, respectively. The speed variation energy consumption rate is defined as an energy consumption rate per unit distance that reflects the occurrence tendency of an acceleration/deceleration operation at an average vehicle speed for each of the types of road.

For example, if an average vehicle speed is low due to traffic jam, the vehicle repeatedly starts and stops in a slow-moving line of traffic. Aocordingly, the speed variation energy consumption rate is high. In contrast, if the traffic jam is over and, thus, the average vehicle speed increases to higher than a predetermined speed, the vehicle can travel along a longer distance at a constant speed. Accordingly, the speed variation energy consumption rate decreases and reaches a constant value. In an express way, the speed limit is higher than that in an urban street and, thus, the fluctuating range of the vehicle speed increases. Accordingly, the magnitude of acceleration when an acceleration/deceleration operation is performed tends to increase. Therefore, as illustrated in FIG. 6, the speed variation energy consumption rate for an express way is higher than that for an urban street.

Figure 7:
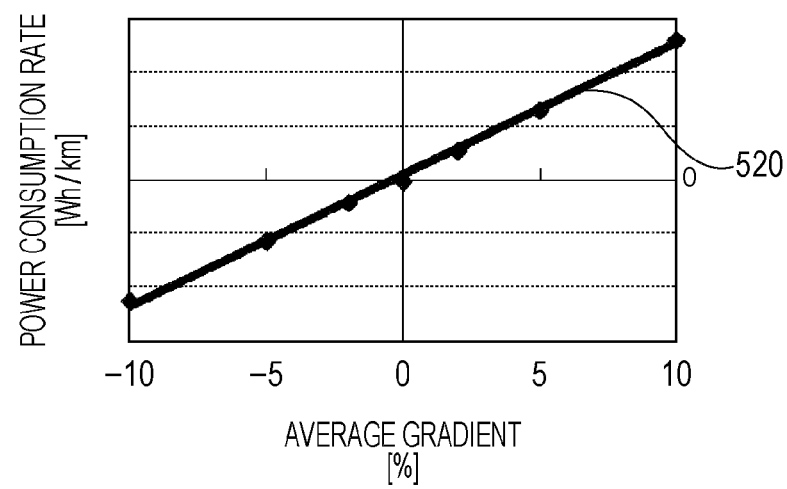
FIG. 7 illustrates an example of gradient power consumption rate data stored in the information storage unit of the route planning device.

FIG. 7 illustrates an example of the gradient power consumption rate data 323 stored in the information storage unit 16. In FIG. 7, the abscissa represents an average gradient, and the ordinate represents a power consumption rate. A curve 520 indicates the magnitude of a power consumption rate generated by the presence of the average gradient. In a region in which the average gradient is positive (a positive value), extra power consumption is required for traveling uphill. Accordingly, the power consumption rate increases with increasing absolute value of the average gradient.

In contrast, in a region in which the average, gradient is negative (a negative value), a battery can be recharged using the power generated by a motor due to regenerative braking when the vehicle travels downhill. Accordingly, the power consumption rate is negative. The absolute value of the power consumption rate increases with increasing absolute value of the average gradient. Note that if the average gradient is zero (0), power consumption in an uphill and battery recharging in a downhill are repeated. As a result, the road link can be considered as a flat road on the whole and, thus, the power consumption rate is zero.

In addition, when calculating the driving power consumption, the driving power calculator 42 refers to the driver characteristic data 362 included in the driver data 36 stored in the information storage unit 16 and selects a coefficient α (a driver characteristic coefficient α) corresponding to the evaluation value of the driver characteristics. Such selection of a driver characteristic coefficient α can be performed by, for example, prestoring conversion table indicated by Table 1 in the driver characteristic data 352 stored in the information storage unit 16 and referring to the conversion table.

TABLE 1

| Driver Characteristic Evaluation Value | Driver Characteristic Coefficient |
| --- | --- |
| 3 (Sporty) | 1.03 |
| 2 (Moderate) | 1.01 |
| 1 (Gentle) | 1.0 |

The driving power calculator 42 obtains a length LEN, an average speed VELa, an average gradient SLa, and the road type of each of the road links that constitute the planned route from the attribute information about the road link included in the road data 302 stored in the information storage unit 16 on the basis of the road link information regarding each of the planned routes received from the route planner 40. In addition, the driving power calculator 42 calculates a cruising power consumption rate per for each of the drive modes (i.e., three values of per in accordance with the drive modes) and a speed variation energy consumption rate evr of each of the road links on the basis of the cruising power consumption rate data 321 and the speed variation energy consumption rate data 322 stored in the information storage unit 16 and an average speed V of the road link. Furthermore, the driving power calculator 42 calculates a gradient power consumption rate pgr of each of the road links on the basis of the gradient power consumption rate data 323 and the average gradient SLa of the road link included in the information storage unit 16.

Subsequently, the driving power calculator 42 calculates the driving power consumption Pdr of each of the road links on the basis of the selected driver characteristic coefficient α, the cruising power consumption rate per for each of the drive modes, the speed variation energy consumption rate evr, the gradient power consumption rate pgr, and the length LEN of the road link as follows:

$$Pdr=\{(pcr+\beta \times evr) \times \alpha + pgr\} \times LEN \quad (1)$$

where β represents a conversion coefficient for converting the speed variation energy consumption rate evr into the power consumption rate.

As indicated by equation (1), by using the driver characteristic coefficient α when calculating the driving power consumption Pdr of each of the road links, the driving power consumption Pdr can be calculated as a value that well indicates the driver's driving style, that is unique to an individual driver.

The driving power calculator 42 sums the driving power consumption Pdr of each of the road links obtained by using equation (1) for each of the planned routes. Note that since the cruising power consumption rate per is calculated for each of the three drive modes, three values of the cruising power consumption rate per can be obtained for each of the road link. Accordingly, three values of the driving power consumption Pdr for each of the road links can be obtained for the three drive modes using equation (1). Thus, three values of the total drive power consumption Pd for three drive modes (sport, normal, and eco) are calculated for each of the three planned routes (the fastest route, the eco-route, and the standard route). As a result, nine values of the total drive power consumption Pd can be obtained in total. The obtained values of the total drive power consumption Pd are sent to the SOC calculator 46 (described in more detail below).

3. AC Power Calculator

The AC power calculator 44 (refer to FIG. 3) is described next. The AC power calculator 44 calculates power consumption (AC power consumption) Pee consumed by the air conditioner of the vehicle.

In general, a driver tends to evaluate the comfort level by using the current environment as a reference. Accordingly, the AC power calculator 44 calculates the AC power consumption Pee for each of the following three cases: the case in which a current air conditioner setting temperature To remains unchanged, the case in which the air conditioner setting temperature is increased by 1° C. (Tc+1° C.), and the case in which the air conditioner setting temperature is decreased by 1° C. (Tc−1° C.).

At that time, the AC power consumption Pac is calculated using the basic AC power data 325 and the start-up AC power data 326 stored in the information storage unit 16.

Figure 8:
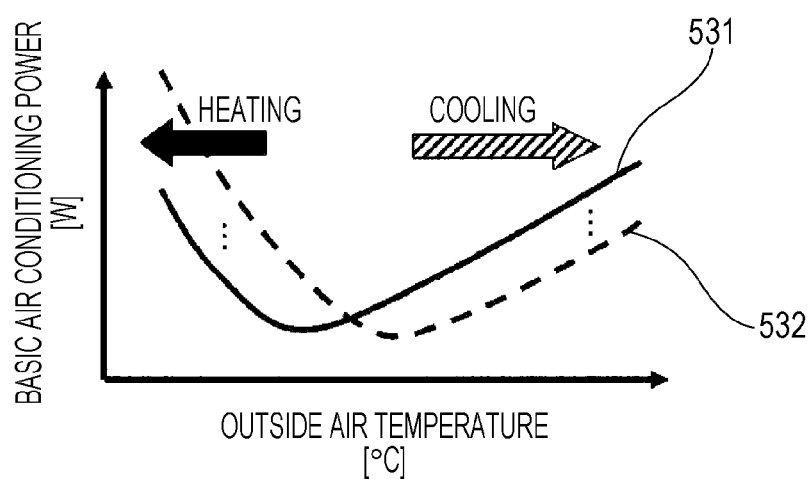
FIG. 8 illustrates an example of basic air conditioner (AC) power data stored in the information storage unit of the route planning device.

The basic AC power data 325 and the start-up AC power data 326 are described next with reference to FIGS. 8 and 9. FIG. 8 illustrates an example of the basic AC power data 325 stored in the information storage unit 16. In FIG. 8, the abscissa represent an outside air temperature, and the ordinate represents the power consumed by the air conditioner per unit time (the basic AC power) in order to maintain the preset temperature. In addition, curves 531 and 532 indicate a relationship between an outside air temperature and the basic AC power at a predetermined maximum solar radiation level (a predetermined intensity of sunlight) and a predetermined minimum solar radiation level, respectively, when a preset air conditioner temperature Ts remains unchanged.

The information storage unit 16 stores the data illustrated in FIG. 3 for each of a plurality of preset air conditioner temperatures Ts. Note that in FIG. 8, only the curves 531 and 532 corresponding to two solar radiation levels are illustrated. However, the basic AC power data corresponding to each of the air conditioner setting temperatures can include curves corresponding to a plurality of solar radiation levels between the highest and the lowest solar radiation levels.

In FIG. 8, the curves 531 and 532 indicate, that, in a region where the outside air temperature is higher than a temperature that is substantially the same as the preset air conditioner temperature Ts, the power consumption increases with increasing outside air temperature due to a cooling operation. In contrast, in a region where the outside air temperature is lower than the temperature that is substantially the same as the preset air conditioner temperature Ts, the power consumption increases with decreasing outside air temperature due to a heating operation. In addition, the room temperature increases with increasing solar radiation level due to solar radiant heat. Accordingly, the basic AC power for the cooling operation increases, and the basic AC power for the heating operation decreases.

Note that the amount of consumption power of the air conditioner also varies with the number of occupants in the vehicle, the humidity, and a setting mode of the air conditioner (e.g., one of automatic temperature setting modes "High", "Normal", and "Low"). Accordingly, for example, the basic AC power data 325 may be stored in the information storage unit 16 for each of the number of occupants in the vehicle, the humidity, and a setting mode of the air conditioner. Thereafter, the basic AC power may be calculated by referring to the basic AC power data 325 corresponding to the current number of occupants in the vehicle, the current humidity, and the current setting mode of the air conditioner during the operation.

Figure 9:
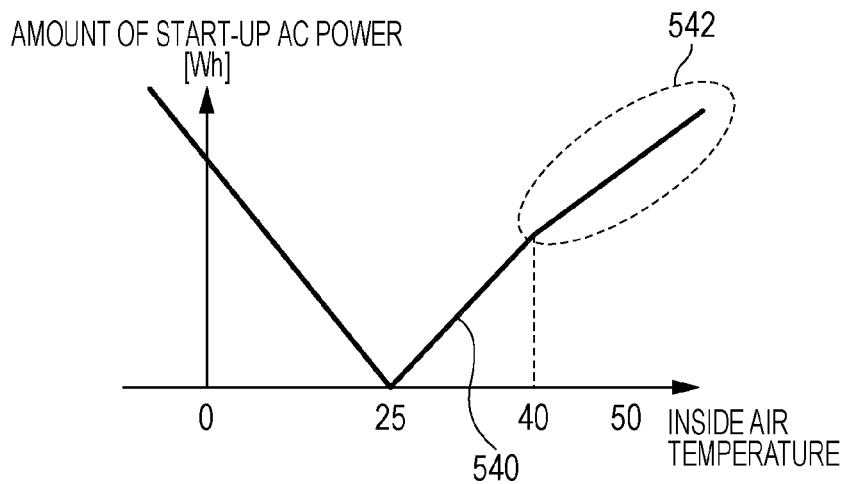
FIG. 9 illustrates an example of start-up AC power data stored in the information storage unit of the route planning device.

FIG. 9 illustrates an example of the start-up AC power data 326 stored in the information storage unit 16. In FIG. 9, the abscissa represent an inside air temperature (a room temperature of the vehicle) sensed when the air conditioner is started, and the ordinate represents the amount of power consumed by the air conditioner from the time the air conditioner is started until the inside air temperature reaches the preset temperature (the start-up AC power). A line 540 indicates the start-up AC power consumption in the form of a general value regardless of an air conditioner setting temperature. The line 540 has a substantially V shape with a maximum value (zero) at a room temperature of 25° C., which is generally comfortable for humans.

That is, the line 540 indicates that the start-up power for cooling increases with increasing room temperature from 25° C., and the start-up power for heating increases with decreasing room temperature from 25° C. The reason why the gradient of increase in an amount of the start-up AC power is gentle in a region 542 of the line 540 is that if the room temperature exceeds 40° C., the passenger generally opens a window of the vehicle to draw outside air and, thus, the room temperature decreases due to outside air flowing into the vehicle interior.

The AC power calculator 44 refers to the basic AC power data 325 and the start-up AC power data 326 stored in the information storage unit 16 and obtains basic AC power pa and start-up AC power energy Ps on the basis of the current outside air temperature Ta, a solar radiation level Lv, and a room temperature Tr for each of the following cases: the case in which the air conditioner preset temperature remains unchanged at a current preset temperature Tc, the case in which the air conditioner preset temperature is set to Tc+1° C., and the case in which the air conditioner preset temperature is set to Tc−1° C. Thereafter, the AC power calculator 44 calculates the AC power consumption Pac using a total driving time Tt of each of the planned routes received from the route planner 40 as follows:

$$Pac = pa \times Tt + Ps \qquad (2).$$

The calculated AC power consumption Sac is sent to the SOC calculator 46 (described in more detail below).

At that time, the current outside air temperature Ta, the solar radiation level Lv, and the room temperature Tr are acquired from the ECU by the processing unit 10 via the wired communication I/F 22. The ECU acquires the information using a temperature sensor and a photoelectric sensor (neither are illustrated) mounted in the vehicle.

Note that the rate of change in the room temperature after the air conditioner starts varies with the number of occupants in the vehicle. Accordingly, the start-up AC power for each of the numbers of occupants may be prestored in the start-up AC power data 326, and the start-up AC power may be calculated on the basis of the current number of occupants in the vehicle.

4. SOC Calculator

The SOC calculator. 46 (refer to FIG. 3) calculates, for each of the planned routes, an estimated value SOCc of the amount of charge remaining in the battery (State of Charge (SOC)) when the vehicle arrives at the destination after the vehicle travels along the planned route on the basis of the total drive power consumption Pd calculated by the driving power calculator 42 and the AC power consumption Sac calculated by the AC power calculator 44 for the planned route. To calculate the estimated. SOC value SoCe, the battery characteristic data 324 included in the basic data 32 stored in the information storage unit 16 is used.

Figure 10:
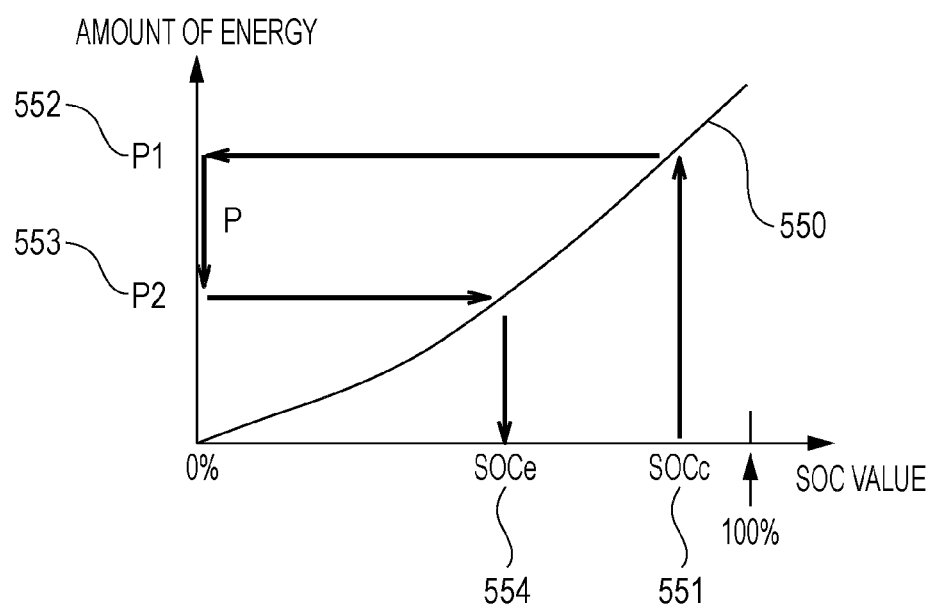
FIG. 10 illustrates an example of battery characteristic data stored in the information storage, unit of the route planning device.

FIG. 10 illustrates an example of the battery characteristic data 324. In FIG. 10, the abscissa represent an SOC value. An SOC value is defined as a percentage of a current amount of charge remaining in the battery with respect to the full charge amount. That is, the SOC=100% on a full charge. The ordinate represents the amount of energy (the amount of electricity). Accordingly, the curve 550 (a battery characteristic curve) indicates the amount of electricity stored in the battery at each of the SOC values.

The estimated value (SOCe) of the SOC value after predetermined power consumption P is consumed can be calculated on the basis of the predetermined power consumption. P and the current SOC value (SOCc) using the battery characteristic curve 550 illustrated in FIG. 10 in the following manner. Power P1 (indicated by a reference symbol "552" in FIG. 10) currently stored in the battery is calculated from SOCc (indicated by a reference symbol "551"), which is the current SOC value, using the battery characteristic curve 550 illustrated in FIG. 10 first. Subsequently, power P2 (indicated by a reference symbol "553") remaining in the battery after the power consumption P is consumed is calculated by subtracting the power consumption P from the power P1. Thereafter, an SOC value (indicated by a reference symbol "554") corresponding to the power P2 is obtained using the battery characteristic curve 550 illustrated in FIG. 10. In this manner, an estimated value SOCe of an SOC value after the power consumption P is consumed can be obtained.

In general, the charge characteristic of a battery depends on an environmental temperature. Accordingly, the battery characteristic data 324 stored in the information storage unit 16 includes battery characteristic data refer to FIG. 10) for each of several predetermined environmental temperatures.

The SOC calculator 45 sums the total drive power consumption. Pd calculated by the driving power calculator 42 for each of the planned routes and the AC power consumption Pac calculated by the AC power calculator 44, thus obtaining total power consumption Pt consumed until the vehicle arrives at the destination along the planned route. Thereafter, the SOC calculator 46 refers to the battery characteristic data that is included in the battery characteristic data 324 stored in the information storage unit 16 and that corresponds to the current outside air temperature Ta and calculates the estimated SOC value SOCe when the vehicle arrives at the destination after traveling along the planned route on the basis of the current SOC value of the battery and the total power consumption Pt calculated in the above-described manner. Note that as described above, the current outside air temperature. Ta is acquired by the processing unit 10 from the ECU via the wired communication I/F 22.

In the above-described manner, the SOC calculator 46 calculates an estimated SOC value for each of four air conditioning settings in each of three drive modes of each of the three planned routes. That is, the SOC calculator 46 calculates thirty six estimated SOC values in total. The calculated estimated SOC values are sent to the comfort level calculator 48 (described in more detail below).

5. Comfort Level Calculator

The comfort level calculator 48 is described next. The comfort level calculator 48 (refer to FIG. 3) calculates the comfort level for each of the planned routes on the basis of the estimated SOC value (SOCe), the total driving time (Tr), the total driving distance (LENt), the current outside air temperature (Ta), and the room temperature (tr) for the planned route. The comfort level is calculated by weighting an SOC-on-arrival comfort level, an arrival time comfort level, a driving distance comfort level, an environment comfort level, and a drive mode comfort level and summing these five comfort levels. Each of the comfort levels is described below.

(1) SOC-on-Arrival Comfort Level

The SOC-on-arrival comfort level is a comfort level based on the amount of charge, remaining in the battery (the SOC) when the vehicle arrives at the destination after traveling along each of the planned routes. In general, the SOC-on-arrival comfort level increases as the power consumption decreases and, thus, the amount of charge remaining in the battery is larger. Accordingly, the SOC-on-arrival comfort level has a higher value as the estimated SOC on arrival (SOCe) has a higher value.

However, if the SOC value is too low when the vehicle arrives at the destination, it may be difficult to drive the vehicle after the arrival. Accordingly, the comfort level calculator 48 evaluates the SOC-on-arrival comfort level on the basis of a value obtained by subtracting a minimum of the SOC value that should be reserved at the arrival time (a threshold SOC value SOCl) from the estimated SOC value (SOCe) (i.e., a surplus SOC value SOCs). Note that the threshold SOC value (Sod) may be predetermined and pre-stored in the information storage unit 15. Alternatively, the driver may input the threshold SOC value SOCl via the operation unit 14.

Figure 11:
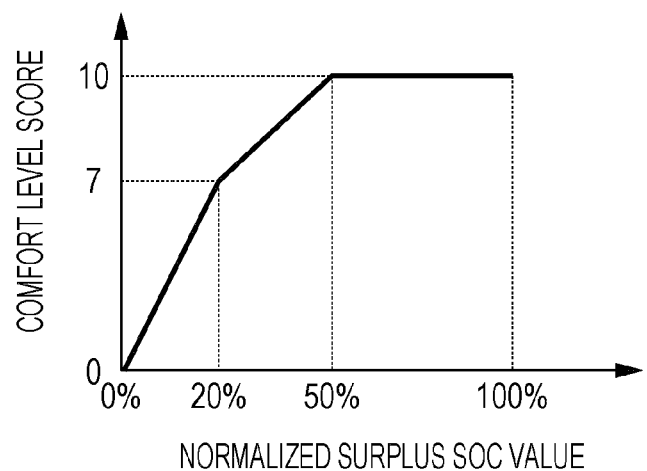
FIG. 11 illustrates an example of SOC comfort level score data stored in the information storage unit of the route planning device.

The comfort level calculator 48 calculates the SOC-on-arrival comfort level using the SOC comfort level score data 341 included in the evaluation reference data 34 stored in the information storage unit 16. FIG. 11 illustrates an example of the SOC comfort level score data 341. In FIG. 11, the ordinate represents a comfort level score based on the SOC value, and the abscissa represents a normalized surplus SOC value. Herein, the normalized surplus SOC value can be expressed as follows:

$$\text{normalized surplus SOC value} = SOCs/(100-SOCl) \times 100\ (\%) = (SOCe-SOCl)/(100-SOCl) \times 100(\%) \quad (3).$$

That is, if the estimated SOC value (SOCe) is the same as the threshold. SOC value (SOCl), the normalized surplus SOC value is 0%. In contrast, if the estimated SOC value (SOCe) is 100%, the normalized surplus SOC value is 100% (however, since the estimated SOC value is an SOC value obtained after the vehicle travels along the planned route, the estimated SOC value is not 100%, in reality).

The comfort level calculator 48 calculates the normalized surplus SOC value on the basis of the estimated SOC value (SOCe) received from the SOC calculator 46 for each of the planned routes using equation (3). Subsequently, the comfort level calculator 48 refers to the SOC comfort level score data 341 stored in the information storage unit 16 and selects an SOC-on-arrival comfort level score $S_{SOC}$. Note that as described above, the estimated SOC value received from the SOC calculator 46 is calculated for each of four air conditioner settings in each of three drive modes of each of three planned routes. That is, thirty six estimated SOC values are received from the SOC calculator 46. Accordingly, thirty six SOC-on-arrival comfort level scores are calculated in accordance with the thirty six estimated SOC values.

(2) Arrival Time Comfort level

The arrival time comfort level is determined on the basis of the total driving time Tt from the current location to the destination. In general, the comfort level increases with decreasing total driving time. Accordingly, the arrival time comfort level has a higher value as the total driving time decreases. According to the present exemplary embodiment, the total driving time calculated for the fastest route among a plurality of planned routes is the smallest (the smallest value Ttmin). Therefore, the arrival time comfort level is determined on the basis of a delay ratio defined as follows:

$$\text{delay ratio} = (Tt-Ttmin)/Ttmin \times 100(\%) \quad (4).$$

Figure 12:
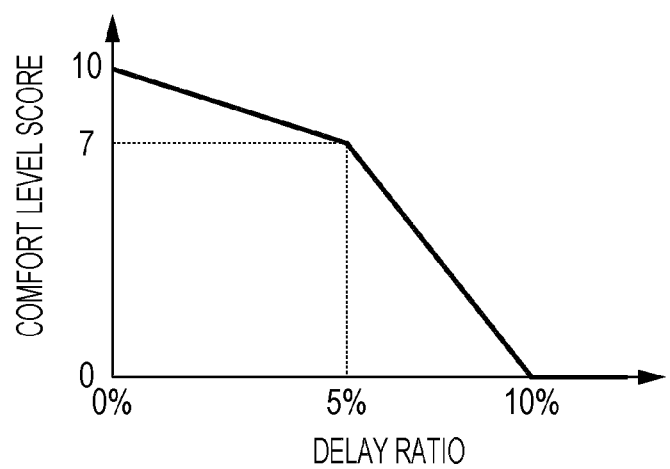
FIG. 12 illustrates an example of time comfort level score data stored in the information storage unit of the route planning device.

The comfort level calculator 48 calculates the arrival time comfort level using the time comfort level score data 342 included in the evaluation reference data 34 stored in the information storage unit 16. FIG. 12 illustrates an example of the time comfort level score data 342. In FIG. 12, the ordinate represents a comfort level score on the basis of an arrival time, and the abscissa represents the delay ratio defined by equation (4). The total driving time increases with increasing delay ratio. Thus, the comfort level score has a lower value. Note: that for the smallest value of the total driving time (i.e., the total driving time of the fastest route among the planned routes), the delay ratio defined by equation (4) is 0% and, thus, a maximum comfort level score is assigned at all times (a score of 10 in the example illustrated in FIG. 12).

The comfort level calculator 48 calculates, using equation (4), the delay ratio for each of the planned routes on the basis of the total driving time of the planned route received from the route planner 40. Thereafter, the comfort level calculator 48 refers to the time comfort level score data 342 stored in the information storage unit 16 and determines the arrival time comfort level. However, even when two planned routes have the same delay ratio value, a delay of the route having a smaller minimum value of the total driving time is longer than that of the other. Thus, the level of comfort that the driver experiences deteriorates.

For this reason, the comfort level calculator 48 multiplies a comfort level Str determined from the time comfort level score data 342 by a correction coefficient γ corresponding to a minimum value of the total driving time to obtain an arrival time comfort level score $S_{TIME}$ as follows:

$$S_{TIME} = \gamma \times Str \quad (5)$$

For example, the above-described correction coefficient γ can be set to one of values illustrated in Table 2. According to an example illustrated in Table 2, if the minimum value of the total driving time is less than 20 minutes, the coefficient γ is set to 0.7. If the minimum value of the total driving time is greater than or equal to 20 minutes and less than 60 minutes, the coefficient γ is set to 1. If the minimum value of the total driving time is greater than or equal to 60 minutes the coefficient γ is set to 1.4.

TABLE 2

| Minimum Value of Total Driving Time | Correction Coefficient γ |
| --- | --- |
| <20 min. | 0.7 |
| 20 min. ≤, <60 min. | 1 |
| ≥60 min. | 1.4 |

Note that the total driving time Tt is received from the route planner 40 for each of the planned routes, that is, the fastest route, the eco route, and the standard route. Thus, three values are obtained. Accordingly, three arrival time comfort levels $S_{TIME}$ are determined so as to correspond to the three total driving times Tt.

(3) Driving Distance Comfort Level

The driving distance comfort level is determined on the basis of the total driving distance LENt from the current location to the destination. In general, the comfort level increases with decreasing total driving distance. Accordingly, the driving distance comfort level has a higher value as the total driving distance decreases. According to the present exemplary embodiment, a shortest total driving distance (the shortest driving distance) LENmin among the planned routes is obtained. Thereafter, a difference between the total driving distance of each of the planned routes and the obtained shortest driving distance (an extension distance) is converted into an extension ratio of the extension distance to the shortest driving distance as follows:

$$\text{extension ratio} = (LENt-LENmin)/LENmin \times 100(\%) \quad (6).$$

The driving distance comfort level is determined on the basis of the extension ratio.

The comfort level calculator 48 calculates the driving distance comfort level using the distance comfort level score data 343 included in the evaluation reference data 34 stored in the information storage unit 16. FIG. 13 illustrates an example of the distance comfort level score data 343. In FIG. 13, the ordinate represents a comfort level score based on a driving distance, and the abscissa represents an extension ratio calculated using equation (6). As the extension ratio increases, the total driving distance increases and, thus, the comfort level score has a lower value.

The comfort level calculator 48 calculates the extension ratio of each of the planned routes on the basis of the total driving distance LENt of the planned route received from the route planner 40 using equation (6). Thereafter, the comfort level calculator 48 refers to the distance comfort level score data 343 stored in the information storage unit 16 and determines the driving distance comfort level. However, even when two planned routes have the same extension ratio, a difference from the shortest driving distance for the route having a larger minimum value of the total driving distance is larger than that of the other. Thus, the level of comfort that the driver experiences deteriorates.

For this reason, the comfort level calculator 40 multiplies a comfort level Slr determined from the distance comfort level score data 343 by a coefficient δ corresponding to a minimum value of the total driving distance to obtain a driving distance comfort level score $S_{LEN}$ as follows:

$$S_{LEN} = \delta \times Slr \tag{7}$$

For example, the above-described coefficient δ can be set to one of values illustrated in Table 3. According to an example illustrated in Table 3, if the minimum value of the total driving distance is less than 10 km, the coefficient δ is set to 0.7. If the minimum value of the total driving distance is greater than or equal to 10 km and less than 20 km, the coefficient δ is set to 1. If the minimum value of the total driving distance is greater than or equal to 20 km, the coefficient δ is set to 1.4.

TABLE 3

| Minimum Value of Total Driving Distance | Correction Coefficient δ |
| --- | --- |
| <10 km | 0.7 |
| 10 km ≤, <20 km | 1 |
| ≥20 km | 1.4 |

Note that the total driving distance LENt is received from the route planner 40 for each of the planned routes, that is, the fastest route, the eco route, and the standard route. Thus, three values are obtained. Accordingly, three, driving distance, comfort level scores $S_{LEN}$ are determined so as to correspond to the three total driving distances LENt.

(4) Environment Comfort Level

The environment comfort level is determined on the basis of the indoor environment during a period of time from the current location to the destination and, in particular, the air conditioner preset temperature. The comfort level calculator 48 calculates the environment comfort level on the basis of an optimum room temperature when the current outside air temperature has a value of Ta.

In general, the most comfortable room temperature (an optimum room temperature) varies with a change in the outside air temperature. For example, the optimum room temperature in a summer season in which the outside air temperature is high is lower than that in a winter season in which the outside air temperature is low. In addition, as a difference between an actual room temperature and the optimum room temperature increases, the comfort level decreases. Accordingly, the comfort level calculator 48 determines the environment comfort level on the basis of a difference between the air conditioner preset temperature and the optimum room temperature. That is, as the temperature difference decreases, the comfort level calculator 48 sets the environment comfort level to a higher value.

Note that the data defining a relationship between the outside air temperature and the optimum room temperature (optimum room temperature data) can be predetermined through, for example, experiments and be stored in the information storage unit 16 in the form of, for example, a table. In addition, the optimum room temperature data can be stored in a storage unit of a server disposed outside the vehicle or a storage unit disposed inside the vehicle. Thereafter, the optimum room temperature data can be downloaded from the storage unit to the information storage unit 16 via the wireless communication unit 20 or the wired communication I/F 22 as needed.

The comfort level calculator 48 calculates the environment comfort level using the environment comfort level score data 344 included in the evaluation reference data 34 stored in the information storage unit 16. Like the time comfort level score data 342 and the distance comfort level score data 343 described above, the environment comfort level score data 344 can be graph data or table, data. For example, the environment comfort level score data 344 can be graph data that define a graph having an abscissa representing the difference between the air conditioner preset temperature, and the optimum room temperature and an ordinate representing a comfort level score.

Upon determining the environment comfort level, the comfort level calculator 48 refers to the above-described optimum room temperature data first and, thereafter, determines the optimum room temperature on the basis of the current outside air temperature. Subsequently, the comfort level calculator 48 calculates a difference between the optimum room temperature and each of Tc, Tc+1° C. and Tc−1° C. using the current preset temperature Tc received from the AC power calculator 44 and the determined optimum room temperature. Thereafter, the comfort level calculator 48 refers to the environment comfort level score data 344 and determines an environment comfort level score $S_{ENV}$ for each of the temperature differences calculated above. In this manner, the environment comfort level score can be obtained when the air conditioner preset temperature is set to each of Tc, Tc+1° C., and Tc−1° C.

(5) Drive Mode Comfort. Level

The drive, mode comfort level is determined for each of three driving modes (i.e., a sport mode, a normal mode, and an eco mode). The comfort level calculator 48 calculates the drive mode comfort level using the driving comfort level score data 345 included in the evaluation reference data 34 stored in the information storage unit 16.

FIG. 14 illustrates an example of the driving comfort level score data 345. The driving comfort level score data 345 is presented in the form of a table. The left column includes drive modes, and the right column includes the comfort level scores each corresponding to one of the drive modes in the same row. In general, the comfort level that the driver experiences for each of the drive mode becomes maximum in the sport mode in which vehicle behavior faithfully reflects the operation performed by the driver. The comfort level for the normal mode is the second highest, and the comfort level for the eco mode is the lowest. Accordingly, in the example illustrated in FIG. 14, a maximum score of 9 is assigned to the sport mode, and the score assigned to the normal mode is smaller than 9. The score assigned to the eco mode is smaller than that for the normal mode.

The comfort level calculator 48 refers to the driving comfort level score data 345 stored in the information storage unit 16 and determines a drive mode comfort level score $S_{MODE}$ for each of the drive modes.

6. Operation Plan Selector

The operation plan selector 513 (refer to FIG. 3) calculates a total comfort level score $S_{TOTAL}$ on the basis of the SOC-on-arrival comfort level score, the arrival time comfort level score, the driving distance comfort level score, the environment comfort level score, and the drive mode comfort level score calculated by the comfort level calculator 48 as follows:

$$S_{TOTAL} = a \times S_{SOC} + b \times S_{TIME} + c \times S_{LEN} + d \times S_{ENV} + e \times S_{MODE} \quad (7).$$

In equation (7), a, b, c, d, and e represent weighting coefficients that indicate the relative importance of each score. The weighting coefficients a, b, c, d, and e are predetermined on the basis of the driver's preference and are included in the driver data 36 stored in the information storage unit 16 as the weighting data 361. The operation plan selector 50 refers to the weighting data 31 and calculates a total comfort level score $S_{TOTAL}$ using equation (7).

As described above, a comfort level score is given to each of three planned routes (the fastest route, the standard route, and the eco route), each of three drive mode (the sport mode, the normal mode, and the eco mode), and four air conditioning setting modes (air conditioning OFF, the current preset temperature Tc, TC+1° C., and TC−1° C.). Accordingly, the operation plan selector 50 calculates, using equation (7), the total comfort level score $S_{TOTAL}$ for each of four air conditioning settings in each of three drive modes of each of the three planned routes. That is, the operation plan selector 50 calculates thirty six total comfort level scores $S_{TOTAL}$ in total.

FIG. 15 illustrates an example of the result of calculation of the total comfort level score $S_{TOTAL}$. In this example, the total comfort level scores are presented in the form of a table. The leftmost column contains three types of planned route (the fastest route, the standard route, and the eco route). As indicated by the second column from the left, each of the routes contains three drive modes (the sport mode, the normal mode, and the eco mode). In addition, the total comfort level scores $S_{TOTAL}$ for the three air conditioning settings air conditioning OFF, the current preset temperature, Tc, TC+1° C., and TC−1° C.) are contained in the third to sixth columns for each of the drive modes. Note that if the air conditioning setting is "air conditioning OFF", the environment comfort level score, $S_{ENV}$ is set to zero (0) and, thereafter, the total comfort level score $S_{TOTAL}$ is calculated.

The operation plan selector 50 selects the top three total comfort level scores $S_{TOTAL}$ (i.e., three total comfort level scores $S_{TOTAL}$ having three largest values) on the basis of the calculated total comfort level scores. Thereafter, the operation plan selector 50 identifies operation plans (combinations of the planned route, the drive mode, and the air conditioning setting) corresponding to the three total comfort level scores $S_{TOTAL}$. At that time, to three total comfort level scores $S_{TOTAL}$ having the largest values may be selected. Alternatively, the total comfort level score $S_{TOTAL}$ having a maximum value for each of the three route types may be selected. In FIG. 15, the total comfort level score $S_{TOTAL}$ having a maximum value: for each of the three route types is in a cell with hatchings.

Subsequently, the operation plan selector 50 displays three operation plans corresponding to the selected top three total comfort level scores $S_{TOTAL}$ on the display unit 12. FIG. 1 illustrates an example of displayed operation plans that provide the selected total comfort level scores $S_{TOTAL}$ (note that FIG. 15 illustrates an example of displayed operation plans that differ from those in FIG. 15). In the example illustrated in FIG. 16, a current amount of charge remaining in the battery 600, a table 610 presenting three operation plans, and a simplified route map 640 indicating the three operation plans are displayed. In the table 510, from the leftmost column to the right, the type of planned route, the drive mode, the air conditioning setting, the SOC on arrival, the total driving distance, and the arrival time are included.

The driver can select a desired operation plan by operating the display screen illustrated in FIG. 16 using the operation unit 14. For example, if the operation unit. 14 is formed from a touch panel disposed on the display screen of the display unit 12, the driver can select a desired operation plan by touching part of the row indicating she desired operation plan in the table. 610 illustrated in FIG. 16.

7. Setting Changer

When the driver selects one of the operation plans in the above-described manner, a setting changer 52 (refer to FIG. 3) sends information regarding the selected operation plan (i.e., information on the planned route, the drive mode, and the air conditioning setting) to the ECU and the navigation system mounted in the vehicle (neither are illustrated) via the wired communication I/F 22. Thus, the setting changer 52 instructs the ECU to preset the drive mode and the air conditioning setting based on the selected operation plan and instructs the navigation system to start giving route guidance in accordance with the planned route (the selected route) indicated by the operation plan. In this manner, the route guidance given by the navigation system is started, and the driver can comfortably sit in the vehicle in a room environment air-conditioned at the air conditioner preset temperature in accordance with the selected operation plan and drive the vehicle along the driving route indicated by the operation plan in a drive mode in accordance, with the operation plan.

8. Setting Change Detector

If, after the driver selects one of the operation plans displayed on the display unit 12 and starts driving a vehicle, the operational setting of the vehicle is changed to the setting that differs from the setting indicated by the operation plan, it is desirable that the route planning device 1 allow the drive to select one of the operation plans for driving the vehicle to the destination in accordance with a new condition after the change again. Such a new condition occurs when the driver changes the preset temperature of the air conditioner, the driver instructs the ECU to change the drive, mode by a manual operation, or the drive strays into a road that is not in the planned route.

A setting change detector 54 acquires information regarding deviation from the specified route, a change in the air conditioner setting temperature, or a change in the drive mode from the navigation system or the ECU via the wired communication I/F 22. If the setting change detector 54 detects such deviation or a change, the processing unit 10 re-plans the routes to the destination and recalculates the total comfort level scores $S_{TOTAL}$ for the planned routes. Thereafter, the processing unit 10 displays a plurality of operation plans having the highest comfort levels on the display unit 12.

Note that when the setting change detector 54 detects one of deviation from the specified route, a change in the air conditioner setting temperature, and a change in the drive mode, the setting change detector 54 may notify the driver of a change in the comfort level and a risk of exhausting the charge remaining in the battery through, for example, the display unit 12, instead of displaying new operation plans.

The sequence of operations performed by the route planning device 1 is described with reference to a flowchart illustrated in FIG. 17. When a user (e.g., a driver) powers on the route planning device 1, the CPU of the processing unit 10 starts this processing. After the route planning device 1 is powered on, the processing unit 10 acquires the average vehicle speed and road traffic information (e.g., road regulation) of each of the road links from the above described Internavi or VICS® via the wireless communication unit 20 at predetermined time intervals concurrently with the processing. Thus, the attribute information (e.g., the average vehicle speed) included in the road data 302 stored in the information storage unit 16 is updated.

Upon starting the processing, the processing unit 10 receives the position information from the GPS receiver unit 18 and identifies the latitude, and longitude of the current location. Thereafter, the processing unit 10 displays a map with the current location centered on the screen of the display unit 12 using the drawing data 301 included in the map data 30 stored in the information storage unit 16 first (S101). Subsequently, upon detecting input of the destination from the user through the operation unit 14 (S102), the processing unit 10 identifies the latitude and longitude of the destination and plans routes from the current location to the destination using the route planner 40 (S103). As described above, in planning the routes, the route planner 40 plans the following three types of route: the fastest route, the standard route, and the eco route.

The processing unit 10 refers to the road data 302 included in the map data 30 stored in the information storage unit 16 and reads the attribute information (e.g., the distance, the average vehicle, speed, the average gradient, and the road type) on each of the road links that constitute the planned route (S104). In addition, the processing unit 10 acquires data necessary for calculating the comfort level score (S105). Examples of the necessary data include the room temperature of the vehicle, the outside air temperature, the solar radiation level, and the air conditioner preset temperature in addition to the basic data 32, the driver data 36, and the evaluation basic data 34 stored in the information storage unit 15.

At that time, the room temperature, the outside air temperature, the solar radiation level, and the air conditioner preset temperature are acquired from the ECU (not illustrated) mounted in the vehicle via the wired communication I/F 22. Note that as described above, some or all of the basic data 32, the driver data 36, and the evaluation basic data 34 may be downloaded from a server disposed outside the vehicle into the information storage unit 16 in response to a request of data regarding the vehicle model from the processing unit 10 to the server via the wireless communication unit 20.

Subsequently, the processing unit 10 calculates, using the driving power calculator 42, the total drive power consumption for each of the planned routes on the basis of the acquired attribute information regarding each of the road links and the basic data 32 (S105). In addition, the processing unit 10 calculates AC power consumption using the AC power calculator 44 (S107). In addition, the processing unit 10 calculates the SOC-on-arrival on the basis of the calculated total drive power consumption and AC power consumption using the SOC calculator 46 (S108).

Subsequently, the processing unit 10 calculates five comfort level scores on the basis of the evaluation basic data 34 and the calculated SOC-on-arrival using the comfort level calculator 48 (S109). The five comfort level scores are the SOC-on-arrival comfort level score, the arrival time comfort level score, the driving distance comfort level score, the environment comfort level score, and the drive mode comfort level score. Note that the comfort level scores are calculated in the above-described manner.

By using the operation plan selector 50, the processing unit 10 acquires weighting coefficients from the weighting data 361 included in the driver data 36 stored in the information storage unit 16. Thereafter, the processing unit 10 calculates the total comfort level score $S_{TOTAL}$ on the basis of the weighting coefficients and the five comfort level scores calculated using equation (7) (S110). In addition, by using the operation plan selector 50, the processing unit 10 selects the top three total comfort level scores and displays the operation plans (the recommended operation plans) that provides the three total comfort level scores on the display unit 12 (S111).

Subsequently, triggered by a user operation to select one of the recommended operation plans displayed on the display unit 12 through the operation unit 14, the processing unit 10 sends the information regarding the selected operation plan to the ECU and the navigation system via the wired communication I/F 22 by using the setting changer 52 (S112). Upon receiving the information, the ECU sets the drive mode and the air conditioner setting in accordance with the setting indicated by the operation plan, and the navigation system starts giving route guidance in accordance with the route indicated by the operation plan (the specified route).

Subsequently, the processing unit 10 determines whether one of deviation from the specified route, a change in the setting of the drive mode, and a change in the setting of the air conditioner is detected by the setting change detector 54 (S113). If deviation from the specified route or a setting change is not detected ("No" in step S113), the processing returns to step S113, and the processing is repeated from step S113. However, if deviation from the specified route or a setting change, is detected ("Yes" in step S113), the processing unit 10 receives the position information using the GPS receiver unit 18 and identifies the latitude and longitude of the current location (S114). Thereafter, the processing returns to step S103, and the processing is repeated from step S103. Note that the processing is completed if the user powers off the route planning device 1.

As described above, according to the present exemplary embodiment, the comfort levels of combinations of a route from the current location to the destination, setting of a drive, mode, and setting of an air conditioner operation are quantified on the basis of the amount of charge remaining in the battery on arrival, the driving distance, the driving time, the drive mode, and the air conditioner preset temperature. Thereafter, the combinations (the operation plans) having the highest comfort levels can be presented to the driver on the basis of the quantified comfort levels (the total comfort level scores). Accordingly, the driver can easily selects one of the operation plans having the highest comfort levels that is the most comfortable for the driver from the driver's point of view. In this manner, the driver can comfortably drive the vehicle.

Note that the route planning device 1 is formed from, for example, a smartphone having a particular program installed therein. However, the route planning device 1 is not limited thereto. For example, some or all of the above-described functions of the route planning device 1 may be integrated into an onboard navigation system. Thus, the route planning device 1 can be formed as an onboard navigation system or part of an onboard navigation system.

While the present exemplary embodiment has been described with reference to calculation of the power consumption and the environment comfort level score based on the air conditioning preset temperature, the power consumption and the environment comfort level score may be calculated on the basis of the setting of onboard electronic equipment including an audio and video (AV) system, such as an onboard audio system or a television receiver.

In addition, while the present exemplary embodiment has been described with reference to weighting coefficients user for calculating the total comfort level score predetermined on the basis of the driver's preference, the weighting coefficients are not limited thereto. For example, the processing unit 10 may store a log of driver's selection of one of the recommended operation plans displayed on the display unit 12. Thereafter, the processing unit 10 may change the weighting coefficients on the basis of the tendency of selection. For example, if the driver frequently selects the fastest route, the processing unit 10 can increase the weighting coefficient for the arrival time comfort level score. In contrast, if the driver frequently selects the sport mode, the processing unit 10 can increase the weighting coefficient for the drive mode comfort level score.

While some specific examples and embodiments are described above, it will be clear that the present disclosure is not limited to these specific examples and embodiments and that many changes and modified embodiments may be obvious to those skilled in the art.

We claim:

1. A route planning device for planning a driving route for an electric vehicle, comprising:
   a processing unit including a computer, the processing unit being configured to:
   upon receiving a position information of a destination, plan one or more driving routes from a current location to the destination,
   calculate an amount of electricity consumed by a motor mounted in the electric vehicle during driving to the destination along each of the planned routes, for each of a plurality of drive modes each having different condition of controlling the motor,
   calculate an amount of electricity consumed by an electric equipment mounted in the electric vehicle during a period of driving along each of the planned routes, for each of a plurality of operational settings of the electric equipment,
   on the basis of the calculated amount of electricity consumed by the motor and the calculated amount of electricity consumed by the electrical equipment, calculate an estimated value of an amount of charge remaining in a battery of the electric vehicle when the electric vehicle arrives at the destination,
   calculate a comfort level score ($S_{SOC}$) for each of the estimated values of the amount of charge remaining in the battery, a comfort level score ($S_{MODE}$) for each of the drive modes, and a comfort level score ($S_{OPE}$) for each of the operational settings of the electrical equipment, a comfort level score ($S_{TIME}$) of an arrival time to the destination for each of the planned routes, and a comfort level score ($S_{LEN}$) of a driving distance for each of the planned routes,
   calculate, for each of the planned routes, a total comfort level score for each of the drive modes and/or each of the operational settings of the electrical equipment by adding ($S_{SOC}$), ($S_{MODE}$), ($S_{OPE}$), ($S_{TIME}$) and ($S_{LEN}$),
   compare respective magnitude of the calculated total comfort level score with one another to select a plurality of operation plans with larger magnitude of the total comfort level score, each of the operation plans defined by a combination of one of the routes, one of the drive modes, and one of the operational settings of the electrical equipment and
   display the selected operation plans on a display unit.

2. The route planning device according to claim 1, wherein the calculated total comfort level score includes a total comfort level score obtained when a current setting of the electrical equipment remains unchanged during the driving to the destination.

3. The route planning device according to claim 1, wherein when one of the selected operation plans displayed on the display unit is chosen, the processing unit performs setting on the electrical equipment directly, or indirectly through another device, and starts giving route guidance in accordance with the chosen operation plan.

4. The route planning device according to claim 1, wherein after route guidance starts in accordance with the chosen one of the operation plans displayed on the display unit, the processing unit detects deviation of the driving vehicle from a route indicated by the chosen operation plan and/or a change in the operational setting of the electrical equipment from the operational setting indicated by the chosen operation plan directly or indirectly via another device and notifies a passenger of the electric vehicle of the deviation and/or the change in the operational setting.

5. A method for planning a driving route for use in an electric vehicle, comprising:
   planning one or more driving routes from a current location to a destination;
   calculating an amount of electricity consumed by a motor mounted in the electric vehicle during driving to the destination along each of the planned routes, for each of a plurality of drive modes each having different condition of controlling the motor;
   calculating an amount of electricity consumed by an electric equipment mounted in the electric vehicle during a period of driving along each of the planned routes, for each of a plurality of operational settings of the electric equipment;
   calculating, on the basis of the calculated amount of electricity consumed by the motor and the calculated amount of electricity consumed by the electrical equipment, an estimated value of an amount of charge remaining in a battery of the electric vehicle when the electric vehicle arrives at the destination;
   calculating, using a processor, a comfort level score ($S_{SOC}$) for each of the estimated values of the amount of charge remaining in the battery, a comfort level score ($S_{MODE}$) for each of the drive modes, and a comfort level score ($S_{OPE}$) for each of the operational settings of the electrical equipment, a comfort level score ($S_{TIME}$) of an arrival time to the destination for each of the planned routes, and a comfort level score ($S_{LEN}$) of a driving distance for each of the planned routes;
   calculating, for each of the planned routes, using the processor, a total comfort level score for each of the drive modes and/or each of the operational settings of the electrical equipment by adding ($S_{SOC}$), ($S_{MODE}$), ($S_{OPE}$), ($S_{TIME}$) and ($S_{LEN}$);
   comparing, using the processor, respective magnitude of the calculated total comfort level score with one another to select a plurality of operation plans with larger magnitude of the total comfort level score, each of the operation plans defined by a combination of one of the routes, one of the drive modes, and one of the operational settings of the electrical equipment; and
   displaying the selected operation plans on a display unit.

6. A non-transitory computer-readable storage medium with an executable program stored thereon, wherein the program instructs a processor to perform the steps comprising:

planning one or more driving routes from a current location to a destination;

calculating an amount of electricity consumed by a motor mounted in the electric vehicle during driving to the destination along each of the planned routes, for each of a plurality of drive modes each having different condition of controlling the motor;

calculating an amount of electricity consumed by an electric equipment mounted in the electric vehicle during a period of driving along each of the planned routes, for each of a plurality of operational settings of the electric equipment;

calculating, on the basis of the calculated amount of electricity consumed by the motor and the calculated amount of electricity consumed by the electrical equipment, an estimated value of an amount of charge remaining in a battery of the electric vehicle when the electric vehicle arrives at the destination;

calculating a comfort level score ($S_{SOC}$) for each of the estimated values of the amount of charge remaining in the battery, a comfort level score ($S_{MODE}$) for each of the drive modes, and a comfort level score ($S_{OPE}$) for each of the operational settings of the electrical equipment, a comfort level score ($S_{TIME}$) of an arrival time to the destination for each of the planned routes, and a comfort level score ($S_{LEN}$) of a driving distance for each of the planned routes;

calculating, for each of the planned routes, a total comfort level score for each of the drive modes and/or each of the operational settings of the electrical equipment by adding ($S_{SOC}$), ($S_{MODE}$), ($S_{OPE}$), ($S_{TIME}$) and ($S_{LEN}$);

comparing respective magnitude of the calculated total comfort level score with one another to select a plurality of operation plans with larger magnitude of the total comfort level score, each of the operation plans defined by a combination of one of the routes, one of the drive modes, and one of the operational settings of the electrical equipment; and displaying the selected operation plans on a display unit.

7. The route planning device according to claim 1, wherein the comfort level score for each of the drive modes is set as proportional to a power consumption rate per unit distance of the electric vehicle.

8. The route planning device according to claim 1, wherein the comfort level score for each of the estimated values of the amount of charge remaining in the battery is set as proportional to the amount of charge remaining in the battery.

9. The route planning device according to claim 1, wherein the electric equipment mounted in the electric vehicle is an air conditioner.

10. The route planning device according to claim 9, wherein the plurality of operational settings of the electric equipment is temperature settings of the air conditioner.

11. The route planning device according to claim 10, wherein the comfort level score for each of the operational settings of the electrical equipment is set as inversely proportional to a difference between an air conditioner set temperature and an optimum room temperature.

12. The route planning device according to claim 1, wherein the route planning device is a handheld device.

13. The route planning device according to claim 1, wherein the route planning device is a mobile phone.

* * * * *